US008915529B1

(12) United States Patent
Bond

(10) Patent No.: US 8,915,529 B1
(45) Date of Patent: Dec. 23, 2014

(54) DEVICE FOR AIDING A USER IN REMOVING ITEMS FROM A TRUCK BED

(76) Inventor: Edward Arthur Bond, Winchendon, MA (US)

( * ) Notice: Subject to any disclaimer, the term of this patent is extended or adjusted under 35 U.S.C. 154(b) by 86 days.

(21) Appl. No.: 13/604,749

(22) Filed: Sep. 6, 2012

(51) Int. Cl.
*B25J 1/04* (2006.01)

(52) U.S. Cl.
USPC .......... 294/209; 294/26

(58) Field of Classification Search
USPC ........ 294/24, 26, 209, 210, 211; 16/426, 427, 16/430; 410/120, 151; 15/144.4; 172/372; D8/14
See application file for complete search history.

(56) References Cited

U.S. PATENT DOCUMENTS

| | | | | |
|---|---|---|---|---|
| 1,749,103 | A * | 3/1930 | Kortick | 403/247 |
| 4,542,553 | A * | 9/1985 | Cary | 15/236.04 |
| 4,712,821 | A * | 12/1987 | Scharf | 294/181 |
| 5,487,576 | A * | 1/1996 | DuVivier | 294/210 |
| 5,823,590 | A | 10/1998 | Forrest et al. | |
| D459,959 | S * | 7/2002 | Fetterman et al. | D8/14 |
| 6,893,068 | B1 | 5/2005 | Varner | |
| 7,309,088 | B2 | 12/2007 | Fiore et al. | |
| 7,334,825 | B1 * | 2/2008 | Sammon et al. | 294/24 |
| D574,202 | S * | 8/2008 | Rodriguez | D8/14 |
| 7,478,851 | B2 * | 1/2009 | Geller | 294/210 |
| 7,673,912 | B2 * | 3/2010 | Breininger | 294/210 |
| 7,775,570 | B2 | 8/2010 | Taylor | |
| 8,029,035 | B1 | 10/2011 | Bottner | |
| 8,262,147 | B2 * | 9/2012 | Boyum | 294/209 |
| 2011/0072956 | A1 | 3/2011 | Wall | |

* cited by examiner

*Primary Examiner* — Paul T Chin
(74) *Attorney, Agent, or Firm* — Richard L. Miller

(57) ABSTRACT

A static and length adjustable device for aiding a user in removing dissimilar items from a bed of a truck without any modification to the device to remove the dissimilar items. The device includes a pole, a head, length-adjusting apparatus, and attaching apparatus. The pole has a length. The head extends from the pole, and together therewith, are for aiding the user in removing the dissimilar items from the bed of the truck without any modification to the device to remove the dissimilar items. The length-adjusting apparatus is operatively connected to, and selectively adjusts the length of, the pole, and is for facilitating aiding the user in removing the dissimilar items from the bed of the truck without any modification to the device to remove the dissimilar items. The attaching apparatus replaceably attaches the head to the pole.

33 Claims, 6 Drawing Sheets

DEVICE FOR AIDING A USER IN REMOVING ITEMS FROM A TRUCK BED

1. BACKGROUND OF THE INVENTION

A. Field of the Invention

The embodiments of the present invention relate to a pole for grabbing items, and more particularly, the embodiments of the present invention relate to a static and length adjustable device for aiding a user in removing dissimilar items from a bed of a truck without any modification to the device to remove the dissimilar items.

B. Description of the Prior Art

Numerous innovations for poles for grabbing items have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach a static and length adjustable device for aiding a user in removing dissimilar items from a bed of a truck without any modification to the device to remove the dissimilar items.

(1) U.S. Pat. No. 5,823,590 to Forrest et al.

U.S. Pat. No. 5,823,590 issued to Forrest et al. on Oct. 20, 1998 in U.S. class 294 and subclass 104 teaches an adjustable length pole has an attachment with at least two fingers that are moveable to provide gripping force. In one embodiment, the fingers are opposed digits that are moveable toward each other to a closed position. The fingers are hinged, and at least one of the fingers is attached to a cord that is operable to move an end of the finger toward an end of the other finger. In a further embodiment, a spring biases the fingers in an open position. The cord is threaded through the middle of the telescoping pole to help prevent it from becoming tangled in tree branches. Further, a portion of the cord includes a spring mechanism, such as an elastic material, to enable a user to set a desired tension for the fingers. Hooks on the telescoping pole secure the cord and allow two handed manipulation of the pole, while the fingers retain desired tension on an object to be moved.

(2) U.S. Pat. No. 6,893,068 to Varner

U.S. Pat. No. 6,893,068 issued to Varner on May 17, 2005 in U.S. class 294 and subclass 24 teaches an elongated and extendable pole having a plurality of holding devices. A flexible platform of predetermined circumference sits atop the pole to press the adhesive end of a decoration to the ceiling. A sharp pointed lip attached to the platform removes the decoration. Opposite the lip is a lead-in slit on the platform, which steadies ribbons or string placed upon the platform. Beneath the platform are a set of contiguous containers to hold the curling ribbon and tiny lightweight decor being hung. Below the containers, to one side of the pole, is an extensible spindle upon which crepe paper streamers are placed and dispensed. Held against the lower portion of the pole is a removable hook that inserts into the spindle thereby providing a place for balloons and larger lightweight decor to be elevated to the ceiling and hung. When not in use, the pole may be hung by the strap connected to its distal end.

(3) U.S. Pat. No. 7,309,088 to Fiore et al

U.S. Pat. No. 7,309,088 issued to Fiore et al. on Dec. 18, 2007 in U.S. class 294 and subclass 24 teaches a dual-purpose tool for both removing the cover plate of a pool skimmer and then removing the basket therein to avoid the dangers of human contact with the contents of the skimmer basket. The tool includes a substantially stiff elongate member with dual-purpose hooks located at opposite ends. One hook is designed for removing the skimmer cover through insertion into the skimmer cover hole located at its center, while the opposite end is designed to hook around the skimmer basket handle for removal of the basket. The tool can be configured in multiple lengths to accommodate skimmers for above and in-ground pools.

(4) U.S. Pat. No. 7,478,851 to Geller

U.S. Pat. No. 7,478,851 issued to Geller on Jan. 20, 2009 in U.S. class 294 and subclass 210 teaches a vehicle hand tool and method of use for opening and closing a vehicle door and performing various additional function. The hand tool includes a hand gripper, a first rod, and a second rod. The first rod includes a first end and a second end. The first end is fixed to the hand gripper. The second rod includes a third end and a fourth end, and is movably mounted to the first rod. The second rod is movable from a storage position wherein the fourth end is adjacent the first rod and an extended position wherein the fourth end is spaced from the first rod. An attachment mechanism is mounted to the fourth end, and a tool is removably mountable to the attachment mechanism. A release button is mounted to the hand gripper or the first rod, and is movable to secure or release the vehicle hand tool from the storage position.

(5) U.S. Pat. No. 7,775,570 to Taylor

U.S. Pat. No. 7,775,570 issued to Taylor on Aug. 17, 2010 in U.S. class 294 and subclass 175 teaches a hook device for coupling with a universal pole, such as a utility pole or hot stick, performs a plurality of functions including at least physically engaging a component of a utility device. The hook device has a base having an axis with a pole attachment for coupling with the universal pole. An arm extends from the base along the axis of the base at the arm's upper portion and bends at an elbow at a right angle extending in a forearm, which together with the axis of the base, define a first plane. A hook portion is connected to the forearm, and has a geometry in a second plane at the first angle from the axis of the forearm. An end portion is connected to the hook portion, and has the same axis as the forearm. A finger is angled from the axis of the forearm at the third angle and angled from the axis of the base at the second angle.

(6) United States Patent Application Publication Number 2011/0072956 to Wall

United States Patent Application Publication Number 2011/0072956 published to Wall on Mar. 31, 2011 in U.S. class 89 and subclass 1.11 teaches a tactical utility pole and door mount system for use by law enforcement. Embodiments of the systems are user-configurable, depending on a particular tactical need. Variations are provided for breaching a locked door, breaching a closed window, and delivering and nearly instantaneously detonating a distraction within the associated structure, breaching a closed window and delivering a stream of OC or other chemical spray within the associated structure, and breaching a closed window and delivering a chemical grenade within the structure. Remote breaching of a door can also achieved using a tactical door mount system and detonation device having a receiver.

(7) U.S. Pat. No. 8,029,035 to Bottner

U.S. Pat. No. 8,029,035 issued to Bottner on Oct. 4, 2011 in U.S. class 294 and subclass 104 teaches a reach extension device for use inside of motor vehicles intended to provide increased reach. The device includes a telescoping handle and an operable spring-style clamping device on its outward end, particularly suited for holding and receiving items often extended out of a car window, such as electronic parking passes, tickets, credit cards, and paper currency. Additionally, the device is provided with a cup-shaped lower section for paying tolls or receiving change.

It is apparent that numerous innovations for poles for grabbing items have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a static and length adjustable device for aiding a user in removing dissimilar items from a bed of a truck without any modification to the device to remove the dissimilar items.

2. SUMMARY OF THE INVENTION

Thus, an object of the embodiments of the present invention is to provide a static and length adjustable device for aiding a user in removing dissimilar items from a bed of a truck without any modification to the device to remove the dissimilar items, which avoids the disadvantages of the prior art.

Briefly stated, another object of the embodiments of the present invention is to provide a static and length adjustable device for aiding a user in removing dissimilar items from a bed of a truck without any modification to the device to remove the dissimilar items. The device includes a pole, a head, length-adjusting apparatus, and attaching apparatus. The pole has a length. The head extends from the pole, and together therewith, are for aiding the user in removing the dissimilar items from the bed of the truck without any modification to the device to remove the dissimilar items. The length-adjusting apparatus is operatively connected to, and selectively adjusts the length of, the pole, and is for facilitating aiding the user in removing the dissimilar items from the bed of the truck without any modification to the device to remove the dissimilar items. The attaching apparatus replaceably attaches the head to the pole.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows.

4. LIST OF REFERENCE NUMERALS UTILIZED IN THE FIGURES OF THE DRAWING

Figure 1:
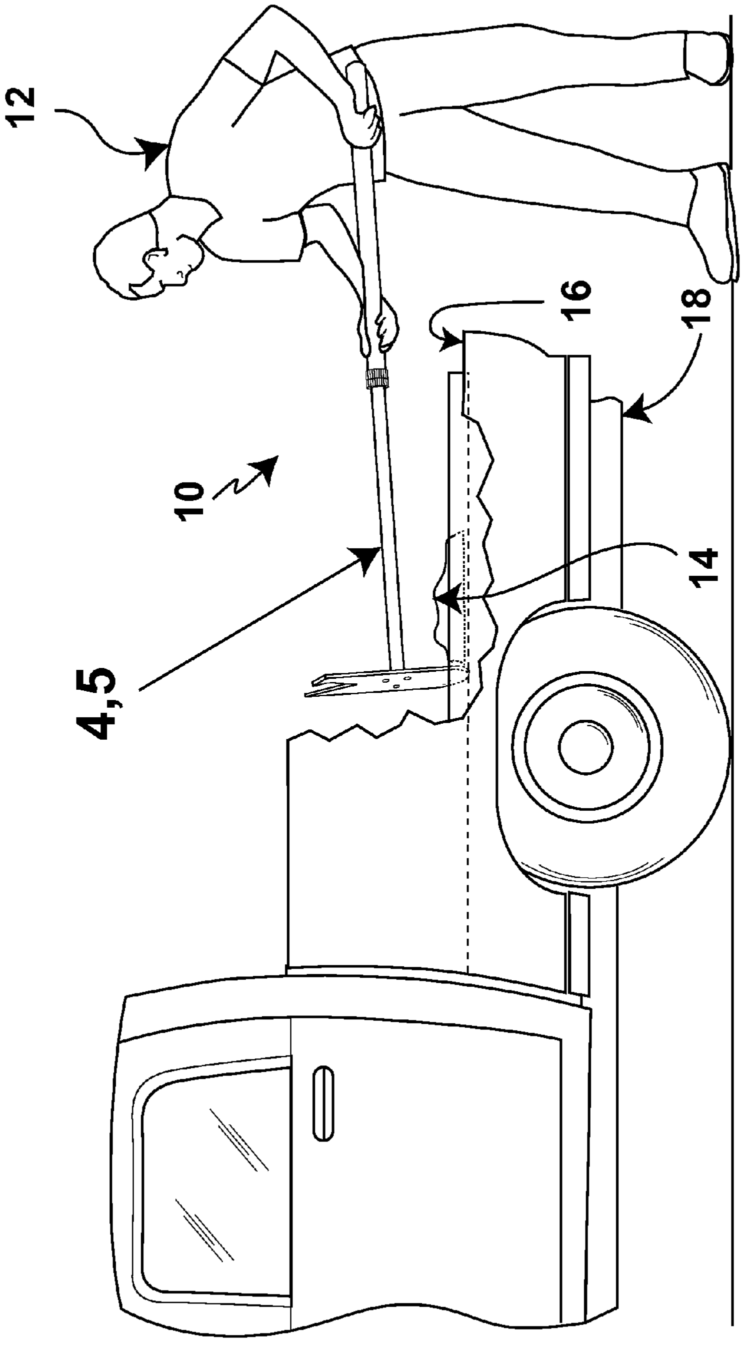
FIG. 1 is a diagrammatic side elevational view of the static and length adjustable device of the embodiments of the present invention aiding a user in removing dissimilar items from a bed of a truck without any modification to the device to remove the dissimilar items.

A. Introductory.

10 static and length adjustable device of embodiments of present invention for aiding user 12 in removing dissimilar items 14 from bed 16 of truck 18 without any modification to device 10 to remove dissimilar items 14

12 user

14 dissimilar items

16 bed of truck 18

18 truck

B. Overall Configuration of Static and Length Adjustable Device 10.

20 pole

22 head

24 length-adjusting apparatus for facilitating aiding user 12 in removing dissimilar items 14 from bed 16 of truck 18 without any modification to device 10 to remove dissimilar items 14

26 attaching apparatus

C. Specific Configuration of Pole 20.

28 proximal tube of pole 20

30 distal tube of pole 20

32 distal end of proximal tube 28 of pole 20
34 proximal end of distal tube 30 of pole 20
36 distal end of distal tube 30 of pole 20

D. Specific Configuration of Head 22.

38 planar sheet of rigid material of head 22
40 pair of longitudinal edges of planar sheet of rigid material 38 of head 22
42 ends of pair of longitudinal edges 40 of planar sheet of rigid material 38 of head 22
44 convexly arcuate edge of planar sheet of rigid material 38 of head 22
46 multi-contoured edge of planar sheet of rigid material 38 of head 22
48 V-shaped portion of multi-contoured edge 46 of planar sheet of rigid material 38 of head 22
50 pair of oblique edges of V-shaped portion 48 of multi-contoured edge 46 of planar sheet of rigid material 38 of head 22
52 V-shaped recess of V-shaped portion 48 of multi-contoured edge 46 of planar sheet of rigid material 38 of head 22
54 sharp-pointed projection of multi-contoured edge 46 of planar sheet of rigid material 38 of head 22
56 hook of multi-contoured edge 46 of planar sheet of rigid material 38 of head 22

E. Specific Configuration of Length-Adjusting Apparatus 24.

58 compressible distal end of distal end 32 of proximal tube 28 of pole 20 of length-adjusting apparatus 24
60 external threads of compressible distal end 58 of distal end 32 of proximal tube 28 of pole 20 of length-adjusting apparatus 24
62 collar of length-adjusting apparatus 24
64 internal threads of collar 62 of length-adjusting apparatus 24
66 external grip-enhancing ridges of collar 62 of length-adjusting apparatus 24

F. Specific Configuration of Attaching Apparatus 26.

68 primary through bore of planar sheet of rigid material 38 of head 22 of attaching apparatus 26
70 threads of primary through bore of planar sheet of rigid material 38 of head 22 of attaching apparatus 26
72 plurality of secondary through bores of planar sheet of rigid material 38 of head 22 of attaching apparatus 26
74 reinforcing ring of attaching apparatus 26
76 primary through bore of reinforcing ring 74 of attaching apparatus 26
78 threads of primary through bore 76 of reinforcing ring 74 of attaching apparatus 26
80 plurality of secondary through bores of reinforcing ring 74 of attaching apparatus 26
82 threads of plurality of secondary through bores 80 of reinforcing ring 74 of attaching apparatus 26
84 common primary through bore of attaching apparatus 26
86 continuous primary threads of attaching apparatus 26
88 plurality of common secondary through bores of attaching apparatus 26
90 plurality of screws of attaching apparatus 26
92 external threads of distal end 36 of distal tube 30 of pole 20 of attaching apparatus 26

5. DETAILED DESCRIPTION OF THE PREFERRED EMBODIMENTS

A. Introductory.

Figure 2:
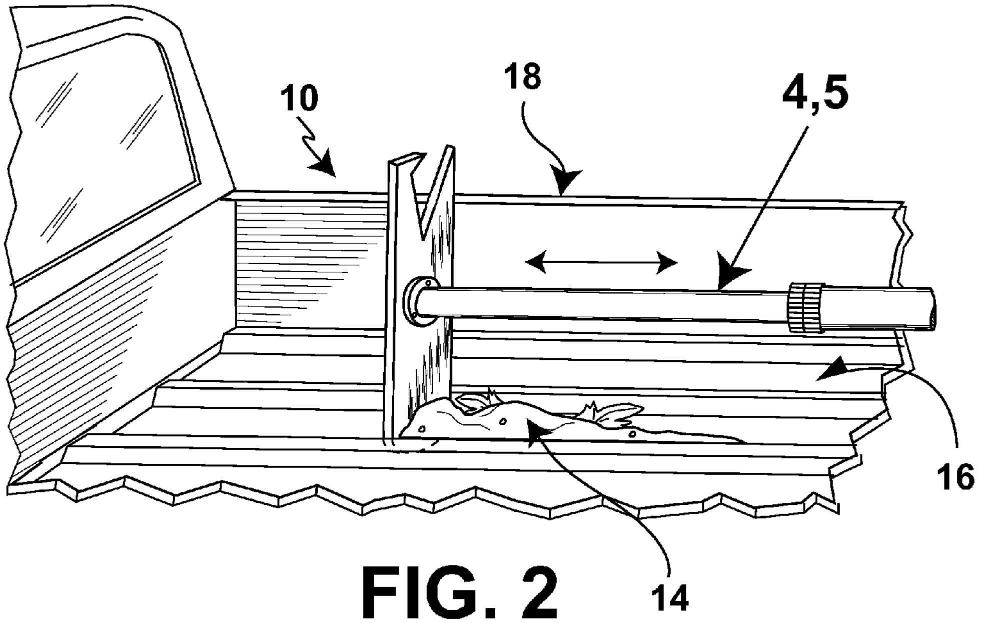
FIG. 2 is a diagrammatic perspective view of the static and length adjustable device of the embodiments of the present invention aiding a user in removing a specific item from a bed of a truck without any modification to the device to remove the specific item.
Figure 3:
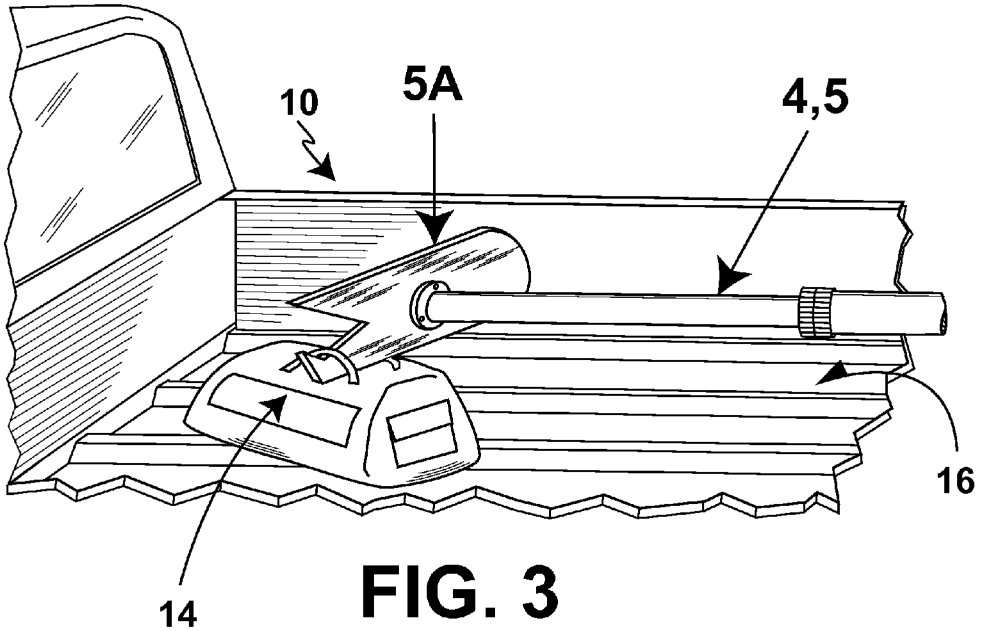
FIG. 3 is a diagrammatic perspective view of the static and length adjustable device of the embodiments of the present invention aiding a user in removing another specific and dissimilar item from a bed of a truck without any modification to the device to remove the another specific and dissimilar item.

Referring now to the figures, in which like numerals indicate like parts, and particularly to FIGS. 1-3, which are, respectively, a diagrammatic side elevational view of the static and length adjustable device of the embodiments of the present invention aiding a user in removing dissimilar items from a bed of a truck without any modification to the device to remove the dissimilar items, a diagrammatic perspective view of the static and length adjustable device of the embodiments of the present invention aiding a user in removing a specific item from a bed of a truck without any modification to the device to remove the specific item, and a diagrammatic perspective view of the static and length adjustable device of the embodiments of the present invention aiding a user in removing another specific and dissimilar item from a bed of a truck without any modification to the device to remove the another specific and dissimilar item, the static and length adjustable device of the embodiments of the present invention is shown generally at 10 for aiding a user 12 in removing dissimilar items 14 from a bed 16 of a truck 18 without any modification to the device 10 to remove the dissimilar items 14.

B. Overall Configuration of the Static and Length Adjustable Device 10.

Figure 4:
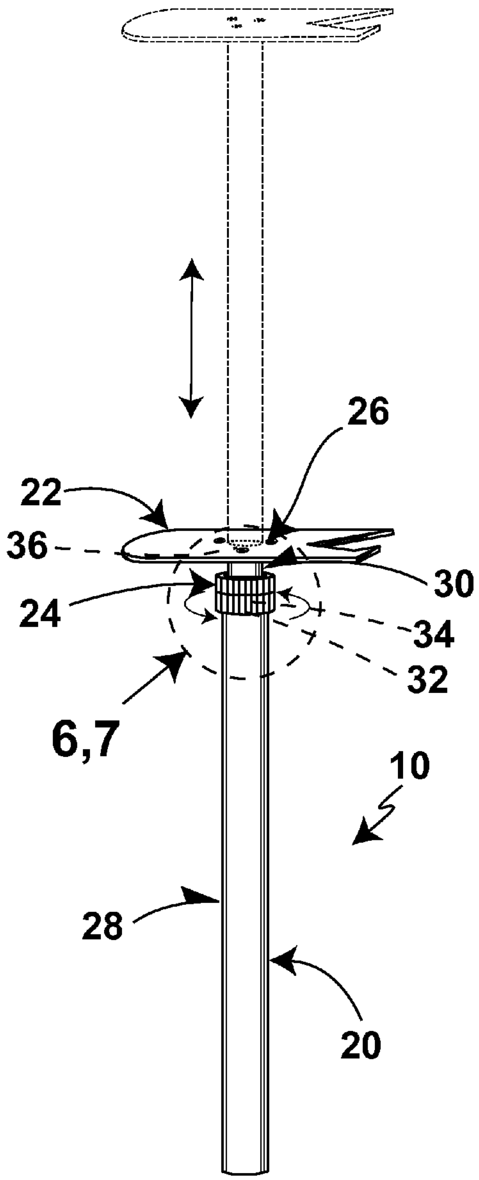
FIG. 4 is a diagrammatic perspective view of the static and length adjustable device of the embodiments of the present invention identified by ARROW 4 in FIGS. 1-3.
Figure 5:
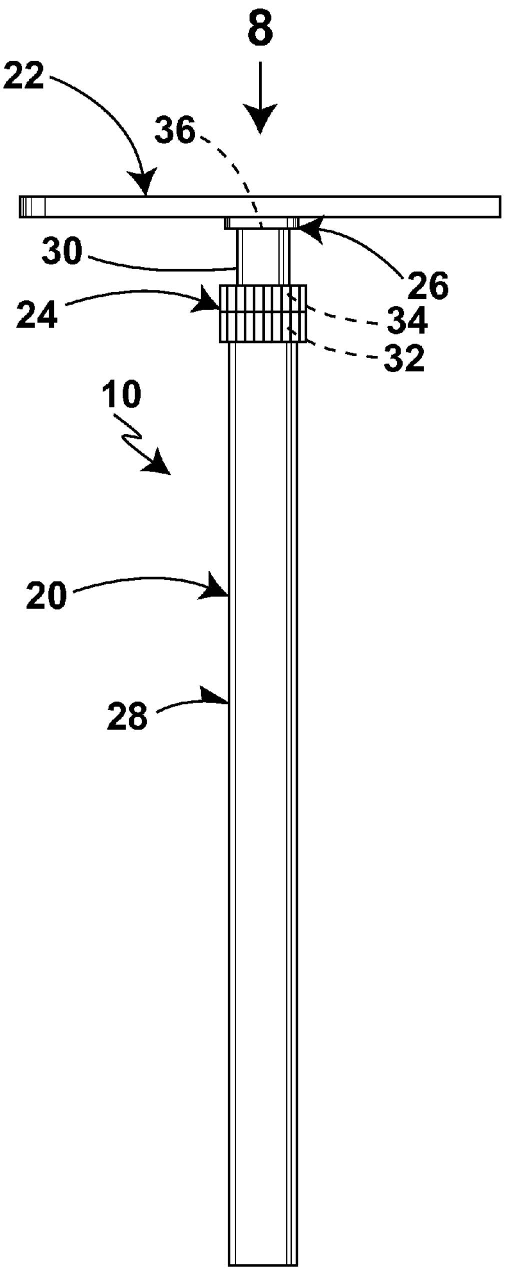
FIG. 5 is a diagrammatic side elevational view of the static and length adjustable device of the embodiments of the present invention identified by ARROW 5 in FIGS. 1-3.

The overall configuration of the static and length adjustable device 10 can best be seen in FIGS. 4 and 5, which are, respectively, a diagrammatic perspective view of the static and length adjustable device of the embodiments of the present invention identified by ARROW 4 in FIGS. 1-3, and a diagrammatic side elevational view of the static and length adjustable device of the embodiments of the present invention identified by ARROW 5 in FIGS. 1-3, and as such, will be discussed with reference thereto.

The static and length adjustable device 10 comprises a pole 20, a head 22, length-adjusting apparatus 24, and attaching apparatus 26.

The pole 20 has a length.

The head 22 extends from the pole 20, and together therewith, are for aiding the user 12 in removing the dissimilar items 14 from the bed 16 of the truck 18 without any modification to the device 10 to remove the dissimilar items 14.

The length-adjusting apparatus 24 is operatively connected to, and selectively adjusts the length of, the pole 20 for facilitating aiding the user 12 in removing the dissimilar items 14 from the bed 16 of the truck 18 without any modification to the device 10 to remove the dissimilar items 14.

The attaching apparatus 26 replaceably attaches the head 22 to the pole 20.

C. Specific Configuration of the Pole 20.

The specific configuration of the pole 20 can best be seen in FIGS. 4 and 5, which are, respectively, again, a diagrammatic perspective view of the static and length adjustable device of the embodiments of the present invention identified by ARROW 4 in FIGS. 1-3, and again, a diagrammatic side elevational view of the static and length adjustable device of the embodiments of the present invention identified by ARROW 5 in FIGS. 1-3, and as such, will be discussed with reference thereto.

The pole 20 comprises a proximal tube 28 and a distal tube 30.

The distal tube 30 of the pole 20 extends telescopically from within the proximal tube 28 of the pole 20.

The distal tube 30 of the pole 20 is maintained at a desired extension from the proximal tube 28 of the pole 20 by the length-adjusting apparatus 24.

The proximal tube 28 of the pole 20 is slender, elongated, and has a distal end 32.

The distal tube 30 of the pole 20 is slender, elongated, and has a proximal end 34 and a distal end 36.

D. Specific Configuration of the Head 22.

Figure 5A:
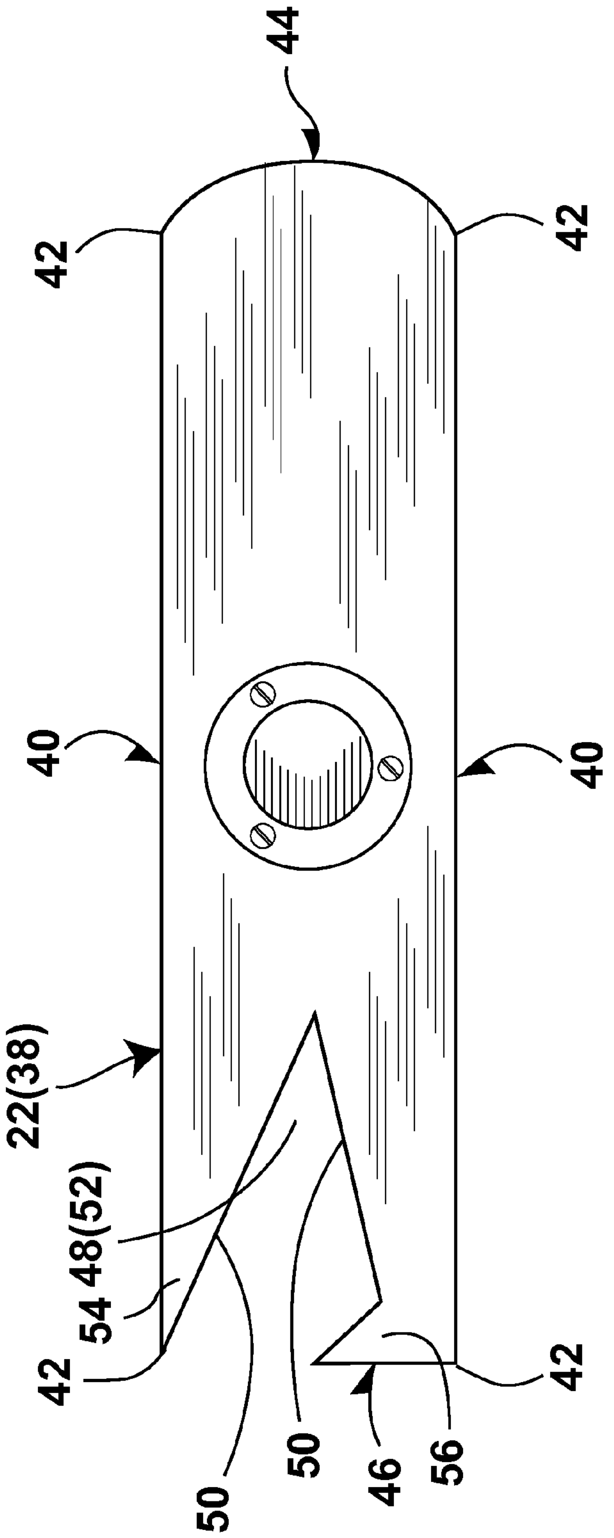
FIG. 5A is an enlarged diagrammatic top plan view of the head of the static and length adjustable device of the embodiments of the present invention identified by ARROW 5A in FIG. 3.

The specific configuration of the head 22 can best be seen in FIG. 5A, which is an enlarged diagrammatic top plan view of the head of the static and length adjustable device of the embodiments of the present invention identified by ARROW 5A in FIG. 3, and as such, will be discussed with reference thereto.

The head 22 is a planar sheet of rigid material 38.

The planar sheet of rigid material 38 of the head 22 comprises a pair of longitudinal edges 40.

The pair of longitudinal edges 40 of the planar sheet of rigid material 38 of the head 22 are straight, are parallel to each other, are spaced-apart from each other, and have ends 42.

A pair of adjacent ends 42 of the pair of longitudinal edges 40 of the planar sheet of rigid material 38 of the head 22 are connected to each other by a convexly arcuate edge 44.

The other pair of adjacent ends 42 of the pair of longitudinal edges 40 of the planar sheet of rigid material 38 of the head 22 are connected to each other by a multi-contoured edge 46.

The multi-contoured edge 46 of the planar sheet of rigid material 38 of the head 22 is opposite to the convexly arcuate edge 44 of the planar sheet of rigid material 38 of the head 22.

The multi-contoured edge 46 of the planar sheet of rigid material 38 of the head 22 comprises a V-shaped portion 48, and as such, is defined by a pair of oblique edges 50 that form a V-shaped recess 52.

One oblique edge 50 of the V-shaped portion 48 of the multi-contoured edge 46 of the planar sheet of rigid material 38 of the head 22, together with an adjacent longitudinal edge 40 of the planar sheet of rigid material 38 of the head 22, form a sharp-pointed projection 54. The sharp-pointed projection 54 of the planar sheet of rigid material 38 of the head 22 is for aiding the user 12 in removing a specific dissimilar item 14 from the bed 16 of the truck 18 without any modification to the device 10 to remove the specific dissimilar item 14.

The other oblique edge 50 of the V-shaped portion 48 of the multi-contoured edge 46 of the planar sheet of rigid material 38 of the head 22, together with the other longitudinal edge 40 of the planar sheet of rigid material 38 of the head 22, form a hook 56. The hook 56 of the planar sheet of rigid material 38 of the head 22 is for aiding the user 12 in removing another specific dissimilar item 14 from the bed 16 of the truck 18 without any modification to the device 10 to remove the another specific dissimilar item 14.

E. Specific Configuration of the Length-Adjusting Apparatus 24.

Figure 6:
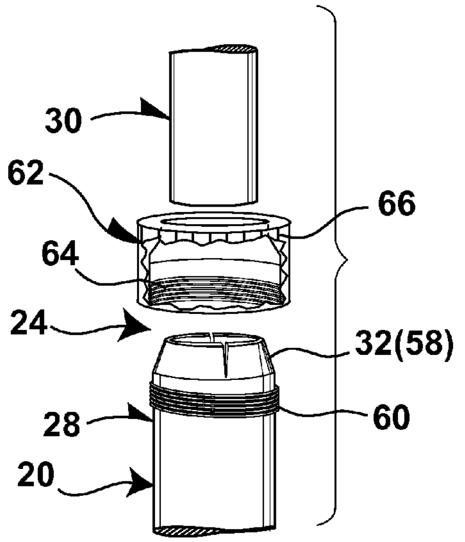
FIG. 6 is an enlarged and exploded diagrammatic perspective view of the area generally enclosed by the dotted circle identified by ARROW 6 in FIG. 4 of the length-adjusting apparatus of the static and length adjustable device of the embodiments of the present invention.
Figure 7:
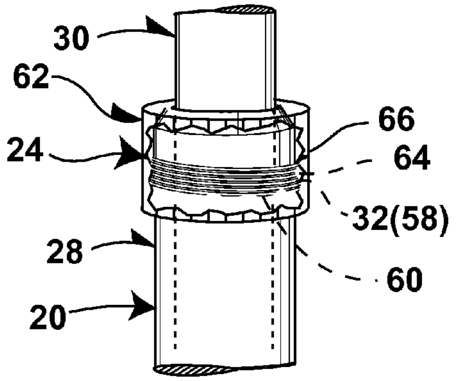
FIG. 7 is an enlarged diagrammatic perspective view of the area generally enclosed by the dotted circle identified by ARROW 7 in FIG. 4 of the length-adjusting apparatus of the static and length adjustable device of the embodiments of the present invention.

The specific configuration of the length-adjusting apparatus 24 can best be seen in FIGS. 6 and 7, which are, respectively, an enlarged and exploded diagrammatic perspective view of the area generally enclosed by the dotted circle identified by ARROW 6 in FIG. 4 of the length-adjusting apparatus of the static and length adjustable device of the embodiments of the present invention, and an enlarged diagrammatic perspective view of the area generally enclosed by the dotted circle identified by ARROW 7 in FIG. 4 of the length-adjusting apparatus of the static and length adjustable device of the embodiments of the present invention, and as such, will be discussed with reference thereto.

The length-adjusting apparatus 24 comprises the distal end 32 of the proximal tube 28 of the pole 20 being a compressible distal end 58.

The length-adjusting apparatus 24 further comprises the compressible distal end 58 of the distal end 32 of the proximal tube 28 of the pole 20 having external threads 60 therearound.

The length-adjusting apparatus 24 further comprises a collar 62.

The collar 62 of the length-adjusting apparatus 24 has internal threads 64 therearound.

The internal threads 64 of the collar 62 of the length-adjusting apparatus 24 selectively engage the external threads 60 of the compressible distal end 58 of the distal end 32 of the proximal tube 28 of the pole 20 of the length-adjusting apparatus 24.

The collar 62 of the length-adjusting apparatus 24 further has external grip-enhancing ridges 66.

(1) Operation of the Length-Adjusting Apparatus 24

Figure 7A:
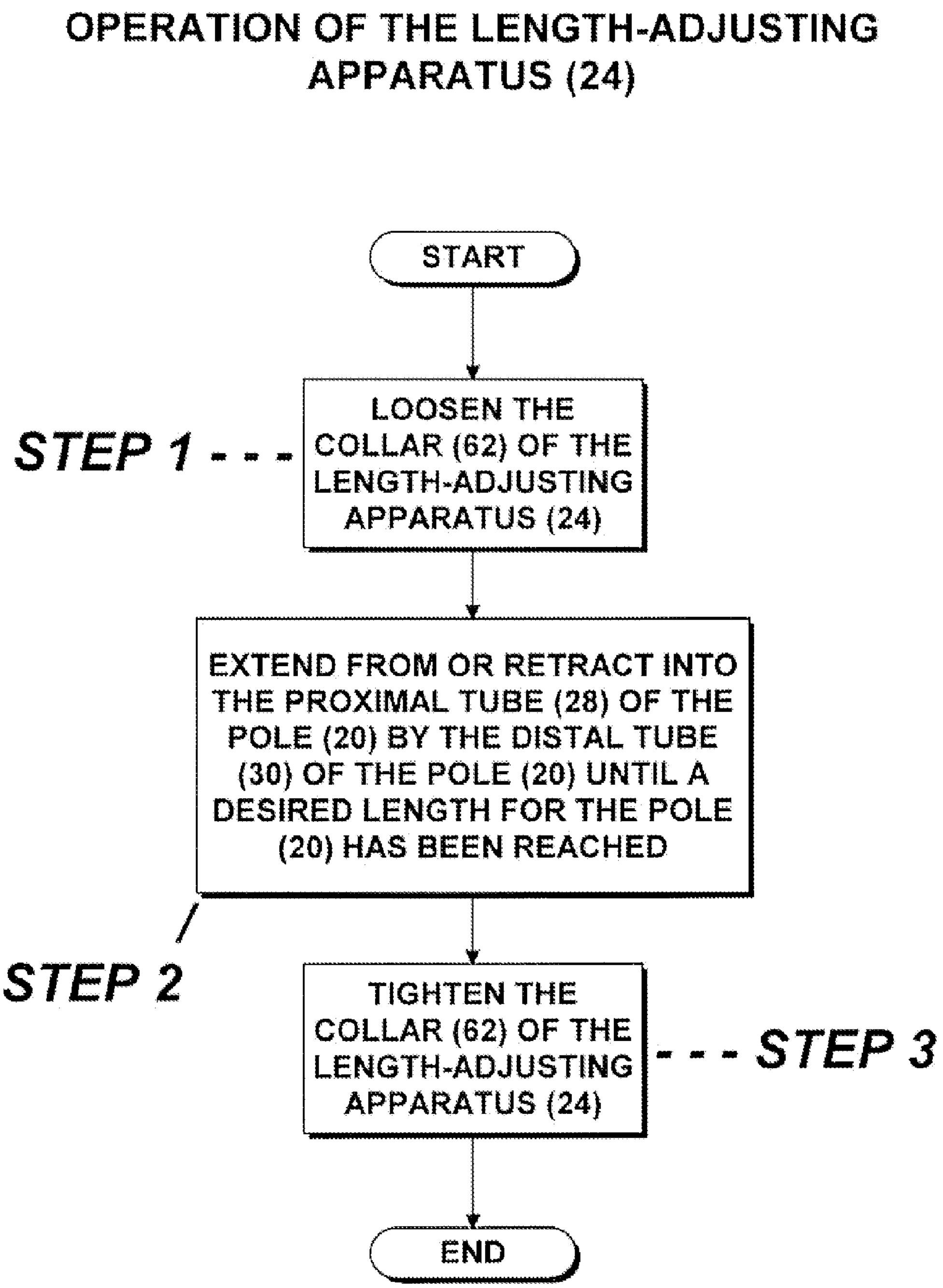
FIG. 7A is a flowchart of the operation of the length-adjusting apparatus of the static and length adjustable device of the embodiments of the present invention.

The operation of the length-adjusting apparatus 24 can best be seen in FIG. 7A, which is a flowchart of the operation of the length-adjusting apparatus of the static and length adjustable device of the embodiments of the present invention, and as such, will be discussed with reference thereto.

STEP 1: Loosen the collar 62 of the length-adjusting apparatus 24;

STEP 2: Extend from or retract into the proximal tube 28 of the pole 20 by the distal tube 30 of the pole 20 until a desired length for the pole 20 has been reached; and STEP 3: Tighten the collar 62 of the length-adjusting apparatus 24.

F. Specific Configuration of the Attaching Apparatus 26.

Figure 8:
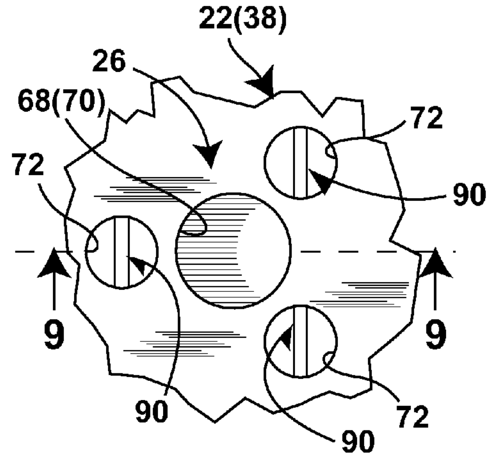
FIG. 8 is an enlarged diagrammatic top plan view taken generally in the direction of ARROW 8 in FIG. 5 of the attaching apparatus of the static and length adjustable device of the embodiments of the present invention.
Figure 9:
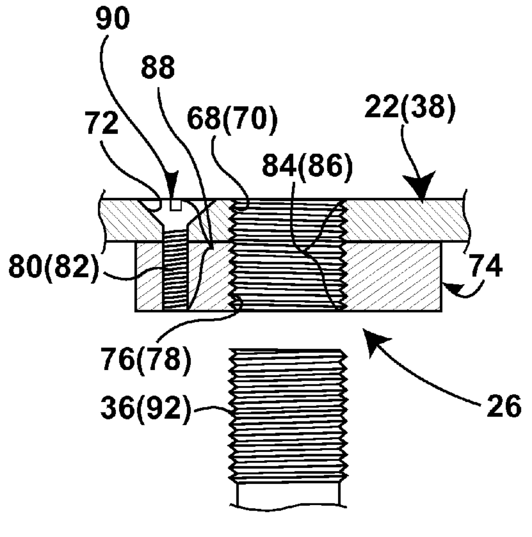
FIG. 9 is an exploded diagrammatic cross sectional view taken along LINE 9-9 in FIG. 8.

The specific configuration of the attaching apparatus 26 can best be seen in FIGS. 8 and 9, which are, respectively, an enlarged diagrammatic top plan view taken generally in the direction of ARROW 8 in FIG. 5 of the attaching apparatus of the static and length adjustable device of the embodiments of the present invention, and an exploded diagrammatic cross sectional view taken along LINE 9-9 in FIG. 8, and as such, will be discussed with reference thereto.

The attaching apparatus 26 comprises the planar sheet of rigid material 38 of the head 22 having a primary through bore 68.

The primary through bore 68 of the planar sheet of rigid material 38 of the head 22 of the attaching apparatus 26 has threads 70, and is generally centrally disposed.

The attaching apparatus 26 further comprises the planar sheet of rigid material 38 of the head 22 having a plurality of secondary through bores 72.

The plurality of secondary through bores 72 of the planar sheet of rigid material 38 of the head 22 of the attaching apparatus 26 are chamfered, and encircle, and are smaller than, the primary through bore 68 of the planar sheet of rigid material 38 of the head 22 of the attaching apparatus 26.

The attaching apparatus 26 further comprises a reinforcing ring 74.

The reinforcing ring 74 of the attaching apparatus 26 has a primary through bore 76.

The primary through bore 76 of the reinforcing ring 74 of the attaching apparatus 26 has threads 78.

The reinforcing ring 74 of the attaching apparatus 26 further has a plurality of secondary through bores 80.

The plurality of secondary through bores 80 of the reinforcing ring 74 of the attaching apparatus 26 have threads 82.

The reinforcing ring 74 of the attaching apparatus 26 is disposed directly below, and is attached to, the planar sheet of rigid material 38 of the head 22, with:

The primary through bore 76 of the reinforcing ring 74 of the attaching apparatus 26 being coaxially aligned with, and a same size as, the primary through bore 68 of the planar sheet of rigid material 38 of the head 22 of the attaching apparatus 26 so as to form a common primary through bore 84;

The threads 78 of the primary through bore 76 of the reinforcing ring 74 of the attaching apparatus 26 being continuous with the threads 70 of the primary through bore 68 of the planar sheet of rigid material 38 of the head 22 of the attaching apparatus 26 so as to form continuous primary threads 86; and The plurality of secondary through bores 80 of the reinforcing ring 74 of the attaching apparatus 26 being coaxially aligned with the plurality of secondary through bores 72 of the planar sheet of rigid material 38 of the head 22 of the attaching apparatus 26, respectively, so as to form a plurality of common secondary through bores 88.

The attaching apparatus 26 further comprises a plurality of screws 90.

The plurality of screws 90 of the attaching apparatus 26 extend through the plurality of secondary through bores 72 of the planar sheet of rigid material 38 of the head 22 of the attaching apparatus 26, and threadably into the plurality of secondary through bores 80 of the reinforcing ring 74 of the attaching apparatus 26 of the attaching apparatus 26, respectively, to thereby attach the reinforcing ring 74 of the attaching apparatus 26 to the planar sheet of rigid material 38 of the head 22.

The attaching apparatus 26 further comprises the distal end 36 of the distal tube 30 of the pole 20 having external threads 92.

The distal end 36 of the distal tube 30 of the pole 20 threadably engages in the common primary through bore 84 of the attaching apparatus 26, with the external threads 92 of the distal end 36 of the distal tube 30 of the pole 20 of the attaching apparatus 26 threadably engaging the continuous primary threads 86 of the attaching apparatus 26 so as to allow the distal tube 30 of the pole 20 to be replaceably attached to the planar sheet of rigid material 38 of the head 22.

G. Impressions.

It will be understood that each of the elements described above or two or more together may also find a useful application in other types of constructions differing from the types described above.

While the embodiments of the present invention have been illustrated and described as embodied in a static and length adjustable device for aiding a user in removing dissimilar items from a bed of a truck without any modification to the device to remove the dissimilar items, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A static and length adjustable device for aiding a user in removing dissimilar items from a bed of a truck without any modification to said device to remove the dissimilar items, comprising:

a) a pole;

b) a head;

c) length-adjusting apparatus; and d) attaching apparatus; wherein said pole has a length; wherein said head extends from said pole; wherein said pole and said head together are for aiding the user in removing the dissimilar items from the bed of the truck without any modification to said device to remove the dissimilar items; wherein said length-adjusting apparatus is operatively connected to said pole; wherein said length-adjusting apparatus selectively adjusts said length of said pole for facilitating aiding the user in removing the dissimilar items from the bed of the truck without any modification to said device to remove the dissimilar items;

wherein said attaching apparatus replaceably attaches said head to said pole; wherein said distal tube of said pole is slender; wherein said distal tube of said pole is elongated; wherein said distal tube of said pole has:

a) a proximal end; and b) a distal end; wherein said head is a planar sheet of rigid material; wherein said planar sheet of rigid material of said head comprises a pair of longitudinal edges:

wherein said pair of longitudinal edges of said planar sheet of rigid material of said head are straight;

wherein said pair of longitudinal edges of said planar sheet of rigid material of said head are parallel to each other;

wherein said pair of longitudinal edges of said planar sheet of rigid material of said head are spaced-apart from each other;

wherein said pair of longitudinal edges of said planar sheet of rigid material of said head have ends;

wherein a pair of adjacent ends of said pair of longitudinal edges of said planar sheet of rigid material of said head are connected to each other by a convexly arcuate edge; wherein the other pair of adjacent ends of said pair of longitudinal edges of said planar sheet of rigid material of said head are connected to each other by a multi-contoured edge; and wherein said multi-contoured edge of said planar sheet of rigid material of said head comprises a V-shaped portion, and as such, is defined by a pair of oblique edges that form a V-shaped recess.

2. The device of claim 1, wherein said distal tube of said pole extends telescopically from within said proximal tube of said pole.

3. The device of claim 1, wherein said distal tube of said pole is maintained at a desired extension from said proximal tube of said pole by said length-adjusting apparatus.

4. The device of claim 1, wherein said proximal tube of said pole is slender;

wherein said proximal tube of said pole is elongated; and wherein said proximal tube of said pole has a distal end.

5. The device of claim 1, wherein said multi-contoured edge of said planar sheet of rigid material of said head is opposite to said convexly arcuate edge of said planar sheet of rigid material of said head.

6. The device of claim 1, wherein one oblique edge of said V-shaped portion of said multi-contoured edge of said planar sheet of rigid material of said head, together with an adjacent longitudinal edge of said planar sheet of rigid material of said head, form a sharp-pointed projection; and wherein said sharp-pointed projection of said planar sheet of rigid material of said head is for aiding the user in removing a specific dissimilar item from the bed of the truck without any modification to said device to remove the specific dissimilar item.

7. The device of claim 6, wherein the other oblique edge of said V-shaped portion of said multi-contoured edge of said planar sheet of rigid material of said head, together with the other longitudinal edge of said planar sheet of rigid material of said head, form a hook; and wherein said hook of said planar sheet of rigid material of said head is for aiding the user in removing another specific dissimilar item from the bed of the truck without any modification to said device to remove the another specific dissimilar item.

8. The device of claim 1, wherein said length-adjusting apparatus comprises said distal end of said proximal tube of said pole being a compressible distal end.

9. The device of claim 8, wherein said length-adjusting apparatus comprises said compressible distal end of said distal end of said proximal tube of said pole having external threads therearound.

10. The device of claim 9, wherein said length-adjusting apparatus comprises a collar.

11. The device of claim 10, wherein said collar of said length-adjusting apparatus has internal threads therearound.

12. The device of claim 11, wherein said internal threads of said collar of said length-adjusting apparatus selectively engage said external threads of said compressible distal end of said distal end of said proximal tube of said pole of said length-adjusting apparatus.

13. The device of claim 10, wherein said collar of said length-adjusting apparatus has external grip-enhancing ridges.

14. The device of claim 1, wherein said attaching apparatus comprises said planar sheet of rigid material of said head having a primary through bore.

15. The device of claim 14, wherein said primary through bore of said planar sheet of rigid material of said head of said attaching apparatus has threads.

16. The device of claim 15, wherein said attaching apparatus comprises said planar sheet of rigid material of said head having a plurality of secondary through bores.

17. The device of claim 16, wherein said plurality of secondary through bores of said planar sheet of rigid material of said head of said attaching apparatus are chamfered; and wherein said plurality of secondary through bores of said planar sheet of rigid material of said head of said attaching apparatus are smaller than said primary through bore of said planar sheet of rigid material of said head of said attaching apparatus.

18. The device of claim 16, wherein said plurality of secondary through bores of said planar sheet of rigid material of said head of said attaching apparatus encircle said primary through bore of said planar sheet of rigid material of said head of said attaching apparatus.

19. The device of claim 16, wherein said attaching apparatus comprises a reinforcing ring.

20. The device of claim 19, wherein said reinforcing ring of said attaching apparatus has a primary through bore.

21. The device of claim 20, wherein said primary through bore of said reinforcing ring of said attaching apparatus has threads.

22. The device of claim 21, wherein said threads of said primary through bore of said reinforcing ring of said attaching apparatus are continuous with said threads of said primary through bore of said planar sheet of rigid material of said head of said attaching apparatus so as to form continuous primary threads.

23. The device of claim 22, wherein said attaching apparatus comprises said distal end of said distal tube of said pole having external threads.

24. The device of claim 20, wherein said primary through bore of said reinforcing ring of said attaching apparatus is coaxially aligned with, and a same size as, said primary through bore of said planar sheet of rigid material of said head of said attaching apparatus so as to form a common primary through bore.

25. The device of claim 24, wherein said distal end of said distal tube of said pole threadably engages in said common primary through bore of said attaching apparatus.

26. The device of claim 23, wherein said external threads of said distal end of said distal tube of said pole of said attaching apparatus threadably engage said continuous primary threads of said attaching apparatus so as to allow said distal tube of said pole to be replaceably attached to said planar sheet of rigid material of said head.

27. The device of claim 19, wherein said reinforcing ring of said attaching apparatus has a plurality of secondary through bores.

28. The device of claim 27, wherein said plurality of secondary through bores of said reinforcing ring of said attaching apparatus have threads.

29. The device of claim 27, wherein said plurality of secondary through bores of said reinforcing ring of said attaching apparatus are coaxially aligned with said plurality of secondary through bores of said planar sheet of rigid material of said head of said attaching apparatus, respectively, so as to form a plurality of common secondary through bores.

30. The device of claim 27, wherein said attaching apparatus comprises a plurality of screws.

31. The device of claim 30, wherein said plurality of screws of said attaching apparatus extend through said plurality of secondary through bores of said planar sheet of rigid material of said head of said attaching apparatus, and threadably into said plurality of secondary through bores of said reinforcing ring of said attaching apparatus, respectively, to thereby attach said reinforcing ring of said attaching apparatus to said planar sheet of rigid material of said head.

32. The device of claim 14, wherein said primary through bore of said planar sheet of rigid material of said head of said attaching apparatus is generally centrally disposed.

33. The device of claim 1, wherein said reinforcing ring of said attaching apparatus is disposed directly below said planar sheet of rigid material of said head; and wherein said reinforcing ring of said attaching apparatus is attached to said planar sheet of rigid material of said head.

* * * * *